J. W. YOUNG.
LOCK JOINT FOR FISHING RODS, &c.
APPLICATION FILED JUNE 14, 1910.
998,318.
Patented July 18, 1911.
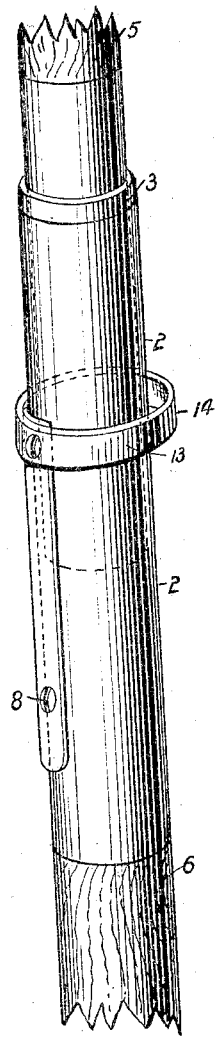
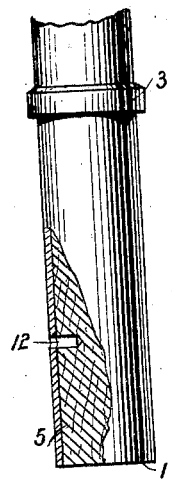
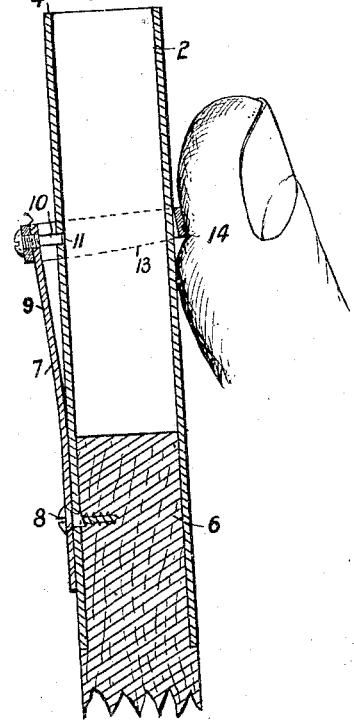
Witnesses
W. P. Burke
A. F. Heuman.
Inventor
James William Young
By
ATTY.

UNITED STATES PATENT OFFICE.

JAMES WILLIAM YOUNG, OF REDDITCH, ENGLAND.

LOCK-JOINT FOR FISHING-RODS, &c.

998,318.  Specification of Letters Patent.  Patented July 18, 1911.

Application filed June 14, 1910. Serial No. 566,824.

*To all whom it may concern:*

Be it known that I, JAMES WILLIAM YOUNG, a subject of His Majesty the King of Great Britain and Ireland, residing at 173 Mount Pleasant, Redditch, England, fishing-reel manufacturer, have invented new and useful Improvements in Lock-Joints for Fishing-Rods, for Securing Tools in Handles, and for other Like Uses, of which the following is a specification.

This invention relates to an improved lock joint for fishing rods, for securing tools in handles and for other like uses, whereby a simple form of lock fast joint is produced which is easily manipulated and not liable to get out of order, while it is impossible for the parts to become accidentally disconnected during use.

In a lock joint constructed in accordance with this invention the cylindrical socket part of the joint in which the spigot fits is furnished on its outside with a spring tongue carrying an inwardly projecting stud which passes through a hole in the socket and engages with a corresponding hole in the spigot, and the outer end of this spring tongue has fixed to it a ring which embraces the socket and is of somewhat larger diameter than the same, and when this ring is pressed as by a person's thumb against the side of the socket opposite to the stud and tongue said tongue is thereby forced away from the socket, and the stud is removed from the hole in the spigot so that the latter can then be withdrawn. The spigot has a collar part which abuts against the end of the socket and limits the distance which the spigot enters the socket, so that by turning the spigot in the socket, when fully inserted therein, the hole in the spigot will coincide with the hole in the socket and the stud will engage in both holes and lock the spigot in the socket as aforesaid.

Our invention is illustrated by the accompanying drawings on which—

Figure 1. is a front perspective view of a lock joint constructed in accordance with this invention, the spigot and socket being illustrated as fixed to two parts of a fishing rod; Fig. 2. shows in part sectional elevation the spigot part of the joint; and Fig. 3. is a sectional front elevation of the socket part of the joint.

In carrying out this invention the spigot end 1 of the joint and the socket 2 of the same are made of cylindrical tubular form as usual and are preferably parallel and of such a size that the spigot will slide and fit properly in the socket. The spigot part 1 has formed on it a collar 3 which, when the spigot 1 is inserted in the socket 2, abuts against the open end 4 of the socket to limit the distance which the spigot will enter the socket. The portion of the rod to which the spigot part 1 is fixed is marked 5 and the other portion of the rod to which the socket part 2 is fixed is marked 6. Fixed to the outside of the socket part 2 at a convenient distance from its open end 4 a spring tongue 7 is fixed as by the screw 8, the free end 9 of this spring tongue being furnished with an inwardly projecting pin or stud 10 which passes through a hole 11 in the socket 2, and when the spigot is inserted in the socket and properly in position therein as hereinafter described, engages in a corresponding hole 12 in the spigot 1. Fixed to the free end 9 of the spring tongue 7 there is a ring 13 which is made of somewhat larger diameter than the external diameter of the socket 2 and of such a size that when the side 14 of the ring 13 opposite to the stud 10 is pressed against the socket 2, as in Fig. 3. the spring tongue 7 is pressed away from the socket 2 thereby removing the stud 10 from the hole 12 in the spigot 1 which latter can then be withdrawn from the socket 2. It will be understood that the spring 7 normally lies against the side of the socket 2 as in Fig. 1. with the stud projecting into the interior of the socket 2 and with the ring 13 projecting beyond the socket opposite to the spring tongue 7.

When securing the spigot end 1 of the joint in the socket 2, the upper part of the spring tongue 7 carrying the stud 10 has to be pressed outwardly as in Fig. 3. by pressing the ring part 14 of the ring 13 against the socket 2 as aforesaid which allows of the spigot 1 being passed right into the socket 2 so that the collar 3 bears against the end 4 of the socket. The ring 13 is then released so that the spring 7 presses the stud 10 against the side of the spigot 1 and then if the hole 12 does not coincide with the hole 11 the spigot is turned around until the two holes coincide, and then the pin 10 is by the spring tongue caused to snap and enter the hole 12 in the spigot thereby effectually locking the spigot into the socket and preventing any accidental disengagement of the same inasmuch as the spigot 1 cannot be removed from the socket 2 until after the spring tongue 7, carrying the stud 10 has by pressure on the portion 14 of the ring 13 as aforesaid, been pressed away from the socket. The holes 12 and 11 can readily be made to coincide with one another by being drilled at one operation after the spigot has been inserted in the socket with the collar 3 pressed against the end 4 of the socket. The ring 13 can conveniently be made separate from the spring tongue 7 and fixed thereto by the stud 10 being formed as a screw and screwed through the ring into the tongue as shown, but if desired the ring 10 may be made in a piece with the spring tongue 7.

What I claim as my invention, and desire to secure by Letters Patent is:—

An improved lock joint for fishing rods, for securing tools in handles, and for other like uses, consisting of a cylindrical socket portion, furnished on its outside with a spring tongue carrying an inwardly projecting stud adapted to engage with a corresponding hole in the spigot, in combination with a ring of somewhat larger diameter than the socket secured to the free end of the spring tongue and embracing the socket, substantially as and for the purpose herein set forth.

In testimony whereof I have signed my name to this specification in the presence of two subscribing witnesses.

JAMES WILLIAM YOUNG.

Witnesses:
CHARLES BOSWORTH KETLEY,
WALTER BARTLAME.